United States Patent [19]
Flood et al.

[11] Patent Number: 6,163,545
[45] Date of Patent: Dec. 19, 2000

[54] SYSTEM AND METHOD FOR DATA TRANSFER ACROSS MULTIPLE CLOCK DOMAINS

[75] Inventors: Paul Flood; Eugene O'Neill, both of Dublin, Ireland

[73] Assignee: 3Com Technologies, Georgetown, Cayman Islands

[21] Appl. No.: 09/007,802

[22] Filed: Jan. 15, 1998

[30] Foreign Application Priority Data

Jan. 17, 1997 [GB] United Kingdom .................. 9701012

[51] Int. Cl.$^7$ ........................................................ H04J 3/16
[52] U.S. Cl. ........................................................ 370/465
[58] Field of Search .................................. 370/465, 535, 370/537, 480, 503, 517, 518, 248, 505; 377/41, 126, 45; 711/167; 714/25; 700/5; 710/260, 5, 1, 21

[56] References Cited

U.S. PATENT DOCUMENTS 5,282,207  1/1994  Jukevich et al. ........................ 370/389
5,570,348  10/1996  Holden ..................................... 370/395

Primary Examiner—Dang Ton
Attorney, Agent, or Firm—Nixon & Vanderhye P.C.

[57] ABSTRACT

A system for converting data in one clock domain to a second clock domain comprises a multiplexer which has a select control which is synchronous with a first frequency and is coupled to two bistable registers of which a first is clock controlled in accordance with the first frequency and a second is clock controlled by the second frequency. The data output of the first register is looped back to the second data input of the multiplexer. The select signal operates to couple a data input to the first register whereupon the multiplexer then serves to couple the data output of the first register back to the data input thereof. The arrangement ensures availability of data at the first clock frequency beyond a transition of the second clock frequency. Thus data, preferably multi-bit address data, can be transferred from one clock domain to another with less delay than in customary systems.

8 Claims, 1 Drawing Sheet

SYSTEM AND METHOD FOR DATA TRANSFER ACROSS MULTIPLE CLOCK DOMAINS

FIELD OF THE INVENTION

The present invention relates to digital systems wherein data, usually multi-bit parallel data, is transferred from one clock domain to another, so that it is changed from synchronism with one clock signal to synchronism with another clock signal at a clock frequency different from that of the first clock signal.

BACKGROUND OF THE INVENTION

There exists a variety of digital data systems, including but not limited to multiple access communication systems, wherein it is necessary or desirable to transfer data which is generated in the domain of one clock frequency to the domain of another clock frequency. Such a requirement may arise because the first domain includes or is controlled by a microprocessor operating at a particular design frequency and the system operating in that domain must be interfaced with a second system which by design or convention operates at a different clock frequency. Systems for changing from one clock frequency domain to another are known in various forms. Where latency, that is to say the time of propagation of a given signal through a system, is not of prime concern within quite wide limits, it has been customary to employ storage buffers into which data is clocked at a first frequency and is read out at a second clock frequency. Systems of this nature are not satisfactory in particular in high speed communication systems where information flow is very substantial, making the use of buffers undesirable, and where any latency which is more than a minimum is likewise undesirable.

It is possible to provide a system comprising a bistable register which receives data, such as decoded address data, and is clocked by a first clock signal to a state machine which couples data out to a bistable register operating at a second clock frequency, but such schemes do not provide a transfer of data from one clock domain to another with minimum latency and a guarantee of stability.

It is the general object of the present invention therefore to provide an improved method or technique for the transfer of data from one domain to another. It is a further object of the invention to provide a fairly simple circuit arrangement, i.e. hardware, for achieving such a transfer.

SUMMARY OF THE INVENTION

The present invention is based on a technique in which a first, normally enabled path extending from a source of data to a bistable register clocked by a first clock signal may be temporarily disabled by a select signal, preferably synchronous with the first clock signal so as to enable passage through a second path extending from the output of the first register back to the data input of it. Such a selective, normally disabled feedback path enables the bistable register to provide data for at least twice the clock period of the first clock signal and thereby to guarantee the stability of data at the output register at one transition of a clock signal at a different frequency provided that the disparity between the frequencies of the clock signals is not too great. The output data from the bistable register may be coupled to another bistable register which is clocked at the second clock frequency.

Such a technique may be usefully employed whether the second clock frequency is lower or greater than the first, provided that the difference in frequency is not excessive. In general, unless additional latency or delay is incorporated, the system is best suited for ratios of less than 2:1 between the faster and slower frequency.

Other features of the invention will be apparent from a consideration of a preferred embodiment which is described by way of example hereinafter with reference to the drawings.

DESCRIPTION OF A PREFERRED EMBODIMENT

Figure 1:
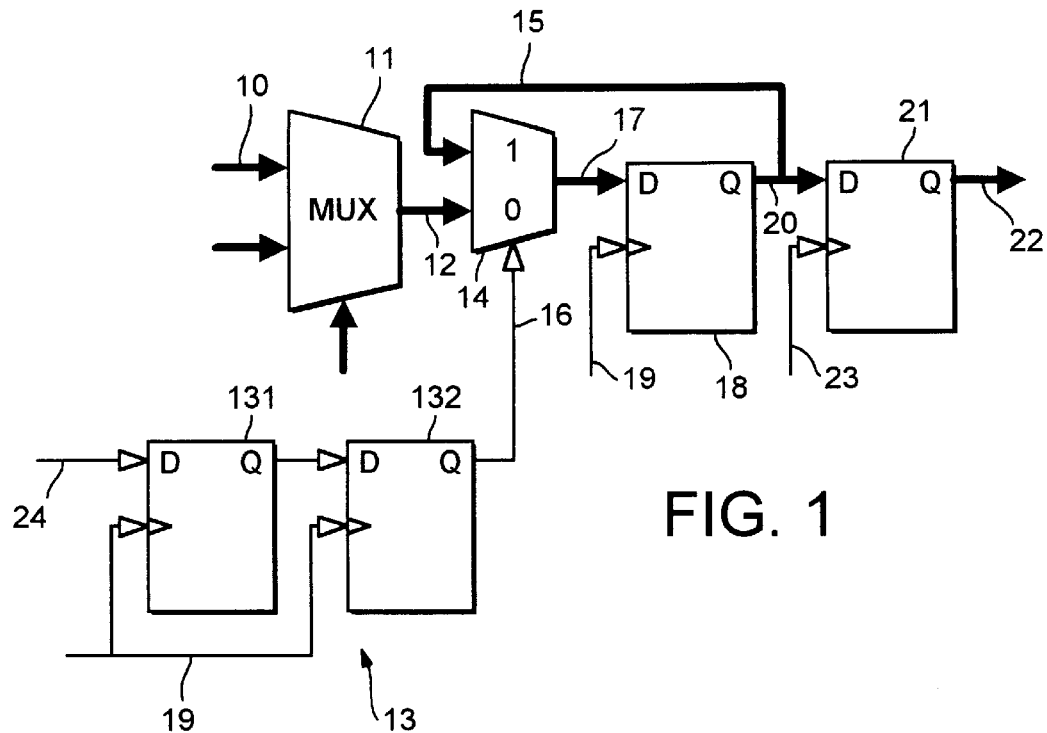
FIG. 1 is a schematic diagram of one embodiment of the invention.

The system shown in FIG. 1 is a hardware system which converts data in a domain governed by a relatively fast clock frequency into a domain governed by a relatively slow clock frequency. The system of FIG. 1 will be described with reference to the timing diagram shown in FIG. 2. As will become apparent, the same hardware system may be used for conversion of data in a relatively slow clock domain to a domain with a relatively fast clock.

A data input for the system shown in FIG. 1 is represented by the lines 10 which are coupled to data sources which are operated synchronously with a first clock, in this example a fast clock. These lines are input to a multiplexer 11 which can select any of the sources in accordance with an address signal. The system shown represents that for a single channel in a multi-bit parallel data channel, typically having thirty-two bits. The data output from the multiplexer 11 is coupled by line 12 to a multiplexer 14 which has a second input line 15 and a select line 16. This multiplexer is operative on receipt of a select signal to couple data on the input line to an output line 17 coupled to the data input of a bistable register 18 which has a clock input coupled to a first clock line 19 in this embodiment controlled by the relatively fast clock (which may be for example at 33 MHz).

The Q data output of the register 18 is coupled by line 20 to the data input of a further bistable register 21 of which the data output is connected to an output line 22. This register 21 has a clock input coupled to a second clock line 23, in this embodiment controlled by a relatively slow clock, typically at 25 MHz.

The Q data output of the register 18 is coupled by way of the line 15 to the second input of the multiplexer 14. Thus this multiplexer 14 is operative on receipt of a select signal to couple a data input synchronous with the fast clock to the data input of the register 18 controlled by the fast clock but otherwise to allow the data output of this register 18 to be coupled by way of the multiplexer 14 to the data input of the same register 18. Thus this arrangement will provide a stable data output to the final register 21 for at least a relevant transition of the clock signal that controls this final register.

The select signal for the multiplexer 14 is obtained from a cascade 13 of two bistable registers 13 of which the first receives on line 24 an address decode signal, which may be asynchronous or synchronous with the slow clock, and is received at the data input at the first register 131 of the cascade 13. This register has its Q data output coupled to the data input of the second register 132 and both stages are coupled to the clock line 19 controlled by the fast clock signal. The purpose of these two registers 131 and 132 is to provide a select signal synchronous with the fast clock for the multiplexer. The use of two registers in cascade avoids or at least reduces the possibility of a metastable condition arising from a change in state at the data input of the first register occurring during a signal transition of the fast clock. If the input to the data input of the first register 131 were synchronous with the fast clock, there would not be any need for the second register 132.

Figure 2:
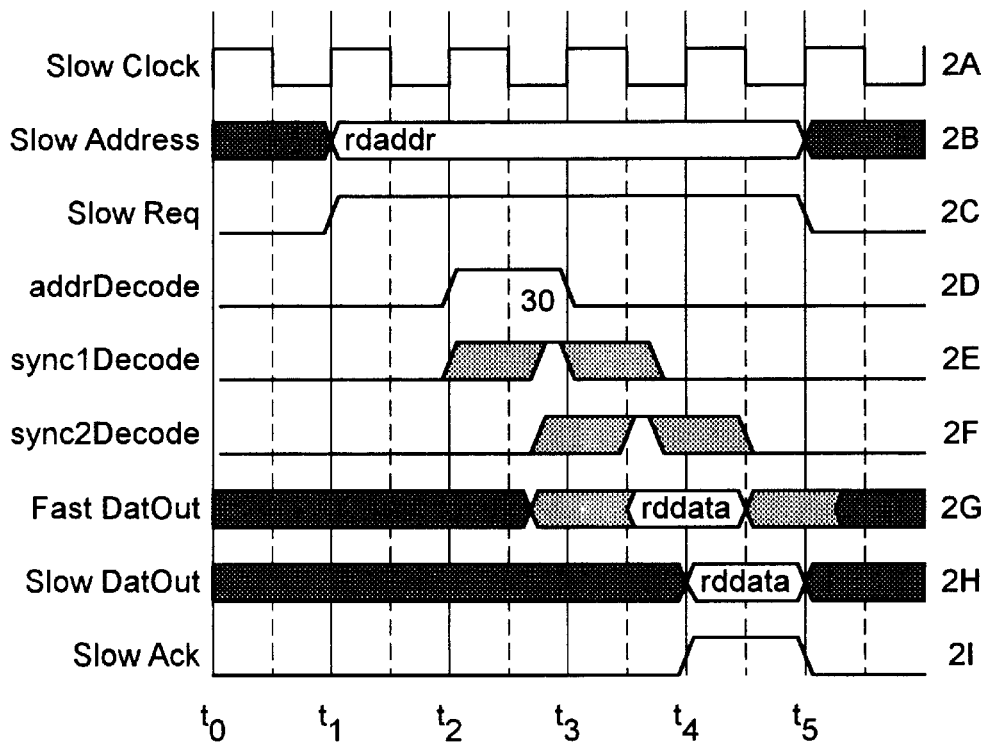
FIG. 2 is a timing diagram for the system described in FIG. 1 wherein a first clock frequency is greater than a second clock frequency.

The operation of the system of FIG. 1 will be readily understood with reference to the timing diagram shown in FIG. 2.

Line 2A of FIG. 2 shows the slow clock, in this example at 25 MHz.

The positive-going transitions of the slow clock are denoted t0, t1, t2 etc.

Line 2B of FIG. 2 shows at time t1 the availability of a 'slow address' at the select input of the input multiplexer. For convenience this slow address is shown as enduring for four cycles of the slow clock and produced, by circuits not relevant to the present invention, in response to a Ôslow requestÔ shown in line 2C of FIG. 2.

Line 2D of FIG. 2 shows an address decode signal which would be input to the data input of the first register 131 at time t2.

Line 2E of FIG. 2 illustrates the output, and possible variation in timing thereof, from the Q output of the first register 131. The earliest time at which the leading transition (at time t2) that the first synchronous decode signal can occur is immediately in response to the leading transition of the address decode signal at the data input of the first register 131. This assumes that the fast clock has a transition which is simultaneous with the positive going transition of the address decode signal. The latest that the first synchronous decode can have a leading edge is one fast clock cycle later, shown by the transition at the right hand end of the shaded area 30.

Similarly, the earliest that the first synchronous decode signal can exhibit its trailing edge is at the trailing edge of the address decode signal at time t3, and the latest that the first synchronous decode can exhibit a trailing edge is one fast clock cycle after the latest time for the leading edge of the first synchronous decode signal.

Line 2F of FIG. 2 shows the second synchronous decode signal which has a range of temporal variations similar to the first synchronous decode signal but occurs exactly one fast clock cycle later than the first synchronous decode. It may be seen that the guaranteed duration of assertion of the second synchronous decode, i.e. the select signal, may be quite short, namely the difference in the clock cycles in the fast and slow domains. In order to ensure therefore that the data coupled to the data input of the fast clock register 18 endures stably beyond a relevant transition of the slow clock, the multiplexer switches to the feedback mode on the assertion of the select signal so as to couple the data output from the register 18 to the input thereof and to prolong this signal at the data input of the final register 21.

The fast data output, which appears on the line coupled to the Q output of the register 18 is shown in line 2G. The earliest that this data can become available is at the earliest possible time for the leading transition of the second synchronous decode signal but it is guaranteed to be available at the latest possible time for the leading transition of the second synchronous decode. It is therefore guaranteed to be available at the next transition (at time t4) of the slow clock signal and is therefore produced at the final data output during times t4 and t5, as shown by line 2H.

The final line 2I of FIG. 2 shows a slow acknowledgement signal, not directly relevant to the present invention, synchronous with the slow output data shown in line 2H.

As mentioned above, the system shown in FIG. 1 can be used in the transfer of data from a slow clock domain to a fast clock domain. The only necessary change is the interchange of the fast clock and the slow clock on the relevant lines.

The system described is preferable for use wherein the frequency ratio between the fast clock and the slow clock is not more than 2:1. If it be greater than 2:1, the data output from the register 18 may not be available in a stable manner at the time of the next transition of the clock controlling the final register and therefore it might be necessary to delay the final output for one clock cycle of the clock controlling the final register 21.

We claim:

1. A system for converting data from one clock domain to a second clock domain, comprising:

a multiplexer having a first data input, a second data input, a select input and a data output;

a first bistable register having a data output coupled to the data output of said multiplexer, a data output and a clock input, the data output of said first bistable register being coupled to the second data input of said multiplexer;

a second bistable register having a data input coupled to the data output of said first bistable register, a data output and a clock input;

a select control register having a data input, a data output and a clock input;

means for providing a first clock signal to the clock input of said first register and to the clock input of said select control register, and a second clock signal to the clock input of said second register; and said multiplexer being operative in the absence of a select signal from the data output of said select control register to couple the first data input of said multiplexer to the data output thereof and being responsive to the select signal to couple the second data input of said multiplexer, and thereby the data output of said first register, to the data input of said first register.

2. A system according to claim 1 wherein said select control register converts a signal at the data input of said select control register to a select signal synchronous with the first clock signal.

3. A system according to claim 1 and further comprising an input multiplexer having a data output coupled to the first data input of said multiplexer and having a select input controlled by the second clock.

4. A system according to claim 1 wherein the first clock signal has a higher frequency than the second clock signal.

5. A system according to claim 1 wherein the second clock signal has a higher frequency than the first clock signal.

6. A system for converting data from one clock domain to a second clock domain, comprising:

a multiplexer having a first data input, a second data input, a select input and a data output;

a first register having a data input coupled to the data output of said multiplexer, a data output coupled to the second data input of said multiplexer, and a clock input coupled to a first clock signal; and a second register having a data input coupled to the data output of said first register, a data output, and a clock input coupled to a second clock signal, wherein, based on a select signal that is synchronous with the first clock signal and that is supplied to the select input of said multiplexer, said multiplexer couples the first data input of said multiplexer to the data output thereof or couples the second data input of said multiplexer, and thereby the data output of said first register, to the data input of said first register.

7. A system according to claim 6, wherein the first clock signal has a higher frequency than the second clock signal.

8. A system according to claim 6, wherein the second clock signal has a higher frequency than the first clock signal.

\* \* \* \* \*